UNITED STATES PATENT OFFICE.

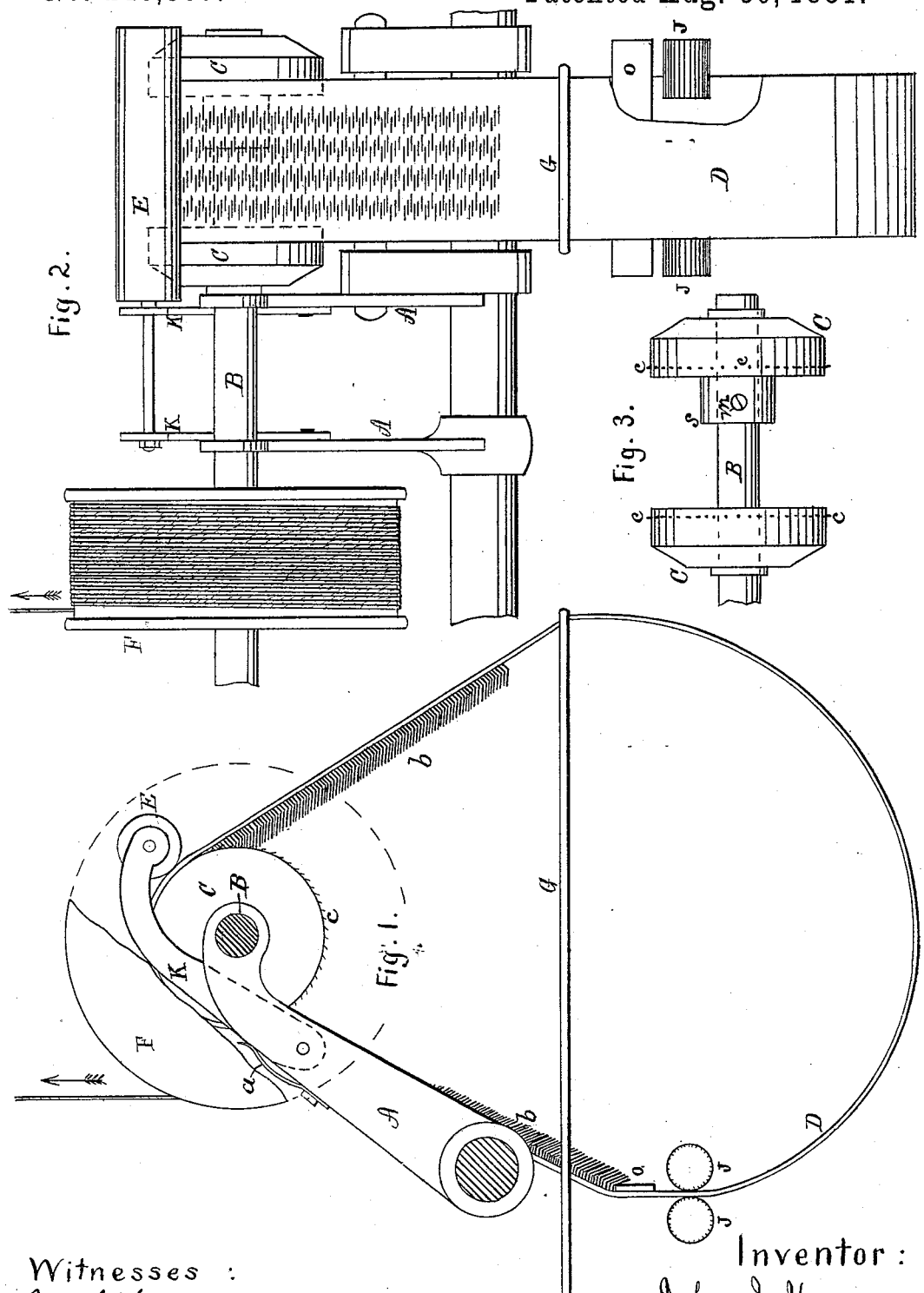

JOHN J. HOEY, OF LAWRENCE, MASSACHUSETTS.

TENSION DEVICE FOR CARD-SETTING MACHINES.

SPECIFICATION forming part of Letters Patent No. 246,507, dated August 30, 1881.

Application filed July 9, 1881. (No model.)

*To all whom it may concern:*

Be it known that I, JOHN J. HOEY, a citizen of the United States, residing at Lawrence, in the county of Essex and State of Massachusetts, have invented certain new and useful Improvements in Tension Devices for Card-Setting Machines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to card-setting machines; and it consists in certain improvements in the construction of the same, as hereinafter shown and described.

Doffer-rings as commonly made are set in one continuous strip and cut in such lengths as will make the required size of ring, a joint being then cut by hand about five-eighths of an inch wide and glued together. The holes for the teeth at the joint have to be reopened with a needle and the teeth inserted again by hand. The work at the joint, therefore, is not uniform with the rest of the card, and it is very essential that the teeth in a doffer-ring should be uniform throughout. As the joint in the leather can be made to be more uniform and even with the rest before the teeth are inserted, a more perfect ring is constructed by this invention, the teeth being inserted afterward in one continuous operation, excepting on a very narrow space, which is not on the joint.

In the drawings referred to, Figure 1 represents, in vertical section, a portion of a card-setting machine having my improvements, with a doffer-ring in process of construction. Fig. 2 shows a front view of same. Fig. 3 is a detached view of the adjustable spur-wheel.

A designates standards having bearings for a shaft, B, on which is a spur-wheel in two divisions, C, each having small teeth $c$ to take the band D at or near its edges. The wheel C is adjustable, and may be extended or contracted in width according to the width of the band D of which the doffer-ring is formed, one division, C, of said wheel being provided with a collar, $s$, (see Fig. 3,) and being movable on shaft B, to which it may be adjustably secured at the required point by means of a screw, $m$, passing through the collar.

E is a roller, which may be provided with a flexible surface, held by pivoted arms K, pressed forward by the springs $a$ over the wheel C, so that it bears against the band D as it passes over the wheel.

F is a drum on shaft B, with a cord wound thereon, to which a weight is attached, by means of which the shaft B and wheel C are rotated.

G is a rod or wire fixed to the main machine in a horizontal position, and forms a guide for the band D, keeping it in proper position during operation. The said band receives the teeth $b$ automatically above the guide O, being delivered by the fluted rollers J. As the teeth are inserted the band D is drawn upward by the spur-wheel C, over which it passes, the roller E meantime pressing the band against the teeth of the wheel and keeping it continually at a tension as the work is effected.

By this device a more perfect doffer-ring is constructed, the teeth being set with more uniformity over the entire surface.

Having described my invention, I claim—

1. In a card-setting machine, a spur-wheel, C, in combination with a roller, E, held by pivoted arms K, provided with springs $a$, and the rolls J J, substantially as and for the purposes described.

2. In a card-setting machine, the adjustable spur-wheel C and roller E, with pivoted arms K and springs $a$, in combination with drum F, with weighted cord, the guides G and O, and the rolls J J, substantially as set forth and described.

In testimony whereof I affix my signature in presence of two witnesses.

JOHN JOSEPH HOEY.

Witnesses:
JAMES WALTER LAWRENCE,
JOHN S. GILE.